H. S. WELLES.
ARTIFICIAL BAIT.
APPLICATION FILED SEPT. 18, 1918.
1,297,617.
Patented Mar. 18, 1919.
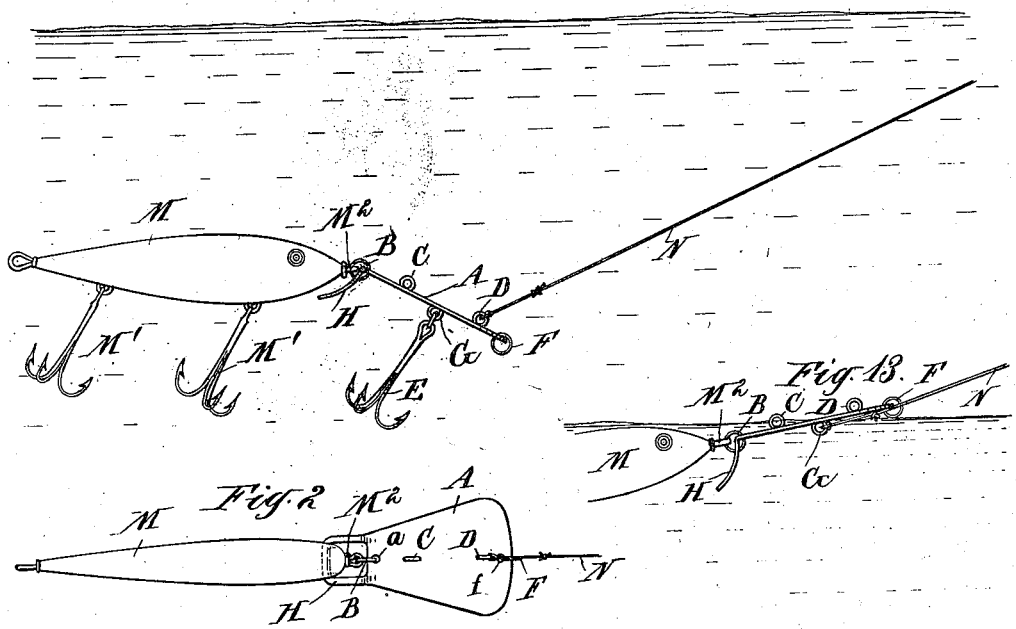
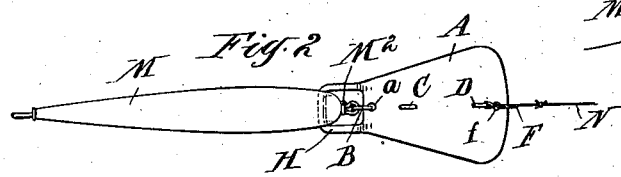
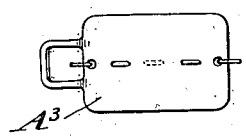
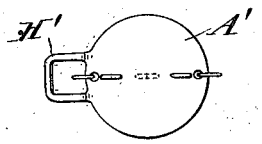
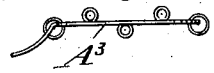
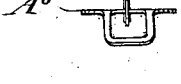
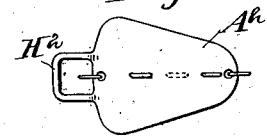
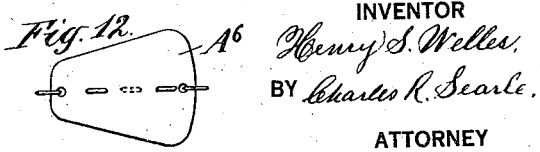
INVENTOR
Henry S. Welles,
BY Charles R. Searle.
ATTORNEY

UNITED STATES PATENT OFFICE.

HENRY S. WELLES, OF NEW YORK, N. Y.

ARTIFICIAL BAIT.

1,297,617.　　　　　Specification of Letters Patent.　　Patented Mar. 18, 1919.

Application filed September 18, 1918. Serial No. 254,579.

*To all whom it may concern:*

Be it known that I, HENRY S. WELLES, a citizen of the United States, residing in the city of New York, borough of Manhattan, in the county and State of New York, have invented a certain new and useful Improvement in Artificial Baits, of which the following is a specification.

The invention relates to diving baits or lures, and the object of the invention is to provide a simple inexpensive device easily attachable to any preferred artificial bait, and forming an attractive part of the latter, by which such bait is caused to travel at any desired depth in the water, or upon the surface.

Another important object is to provide such device with a guard or other means for insuring the proper relation of the device to the bait to avoid entanglement in the casting and trolling operations.

The invention consists in certain novel features and details of construction and arrangement by which the above objects are attained, to be hereinafter described and claimed.

The accompanying drawings form a part of this specification and show preferred forms in which the invention has been carried out in practice.

Figure 1 is a side elevation of an artificial minnow equipped with the invention in the position assumed in diving when drawn through the water.

Fig. 2 is a corresponding plan or top view.

Figs. 3 to 12 inclusive show the device alone in various forms.

Fig. 3 shows the device in the form of a circular plate.

Fig. 4 is a corresponding edge view.

Fig. 5 is a plan view of a triangular form, the reverse of the plate shown in Figs. 1 and 2.

Fig. 6 is an edge view corresponding to Fig. 5.

Fig. 7 is a plan view of a rectangular form of plate.

Fig. 8 is a corresponding edge view.

Fig. 9 is a rear elevation of the plate shown in Fig. 7.

Figs. 10 and 11 are rear elevations showing the plates with concave and convex upper faces respectively.

Fig. 12 is a plan view of a plate similar to that shown in Fig. 2 but with the guard omitted.

Fig. 13 is a side elevation similar to a portion of Fig. 1 but with the plate reversed to cause the bait to rise and travel upon or near the surface.

Similar letters of reference indicate like parts in all the figures.

M is an artificial bait, shown as a minnow, but which may be a frog, spoon, or other lure, equipped with hooks $M^1$ $M^1$ and in all respects as usual. The invention comprises a small plate or disk of metal, preferably brightly polished, but which may be of any suitable material and finished as preferred, adapted to be easily attached to the usual line-eye $M^2$ on the bait and having loops or eyes or other line-attaching means so located as to cause the plate to assume an angular position relatively to the line of draft, which through the drag or resistance offered by the water, induces a downward dive of greater or less depth or an upward movement to the surface, according to the point on the plate at which the line is secured, and carries the attached bait with it as will be understood.

In Figs. 1 and 2 the plate A is of a general elongated triangular form, wider at the front than at the rear, and having a perforation $a$ at the rear or narrow end in which is a link B by which the plate is attached to the line-eye $M^2$ of the bait.

On the upper face of the plate are eyes C and D, and in a perforation $f$ at the front is a ring F, either adapted to receive the line N as may be selected. The line is shown in Figs. 1 and 2 as attached to the eye or loop D forward of the midlength which will induce a moderate angular descent of the plate and bait and maintain them at a practically uniform depth determined by the rate of forward movement of the line due to the motion of the boat in trolling or the rapidity of take-up of the line in casting.

By attaching the line at the eye C the tendency will be to dive deeper and when attached to the ring F to travel just beneath the surface of the water. An eye G on the under face of the plate is shown as carrying a gang of hooks E; by removing the hooks E and attaching the line N to the eye G the plate will be tilted upwardly by the line, as indicated in Fig. 13, and the plate and bait made to skim or skitter upon the surface.

The loose connection of the plate to the bait, through the link B, permits and induces a laterally sinuous or wabbling motion adding to the attractiveness of the lure. Such connection permits the plate and bait to assume positions relatively to each other at various angles both vertically and laterally so that the bait is caused to move freely in imitation of the natural movements of the simulated lure.

On the rear end of the plate A and extending downwardly and rearwardly therefrom is a guard H shown as a loop formed integrally with the plate, adapted to extend beneath the forward end of the bait and prevent the plate and its hooks E from folding downwardly thereon and becoming entangled therewith or with the hooks M¹ in the act of casting. The guard may be otherwise formed, or may be omitted as shown in Fig. 12.

The foregoing description applies to all the various forms shown. In Figs. 3 and 4 the plate A¹ is a circular disk with a guard H¹ at the rear. In Figs. 5 and 6 the plate A² is triangular but reversed from Fig. 2, the guard H² being on the wide end. Figs. 7 and 8 show a plate A³ of rectangular form. Fig. 10 shows a concave plate A⁴ hollowed on its upper face, and Fig. 11 shows a plate A⁵ having a concave upper face rounded longitudinally. The plate A⁶ in Fig. 12 is without the guard which may also be omitted from any of the several forms shown.

The general action of all the forms is similar but the differences in shape produce minor differences of movement in the water and may be adopted to suit the individual preferences of the user.

The device will serve with any type of bait and permits the user to confer diving qualities upon his favorite among the many forms of spoons, plugs, and other floating or heavy casting baits.

I claim:—

1. A substantially plane horizontally disposed plate adapted to be separably attached to the line-eye of a bait, and having means for the attachment of a line, whereby said plate is caused to assume an angular position relatively to the draft of such line and thereby induce an ascending or descending movement of such bait when drawn through the water.

2. A substantially plane horizontally disposed plate adapted to be separably attached to the line-eye of a bait, and having intermediate its ends a plurality of points of attachment for a line, whereby said plate is caused to assume an angular position relatively to the draft of such line, the degree of angularity varying with the point of attachment selected, and thereby induce a descending movement of such bait when drawn through the water.

3. A plate adapted to be separably secured to a bait, having means for the attachment of a line, whereby said plate is caused to assume an angular position relatively to the draft of such line and thereby induce a diving movement of such bait when drawn through the water, and a guard on said plate arranged to contact with said bait and limit the angularity of said plate relatively to said bait.

4. A plate adapted to be separably attached to the line-eye of a bait, having means on its upper face for the attachment of a line, whereby said plate is caused to assume an angular position relatively to the draft of such line and thereby induce a diving movement of such bait when drawn through the water, said plate having means on its under face for the attachment of such line and thereby induce a rising movement of such bait.

5. A plate adapted to be separably secured to a bait, having means on its upper face for the attachment of a line, whereby said plate is caused to assume an angular position relatively to the draft of such line and thereby induce a diving movement of such bait when drawn through the water, and a fish-hook attached to the under face of said plate.

6. A plate adapted to be separably secured to a bait, having means on its upper face for the attachment of a line, whereby said plate is caused to assume an angular position relatively to the draft of such line and thereby induce a diving movement of such bait when drawn through the water, a fish-hook attached to the under face of said plate, the latter having a guard arranged to contact with such bait and prevent entanglement of said hook with said bait.

7. A substantially plane horizontally disposed plate adapted to be separably attached to the line-eye of a bait, and arranged to cause such bait to ascend or descend when drawn through the water.

8. A substantially plane horizontally disposed plate adapted to be separably attached to the line-eye of a bait in advance of the latter, and arranged to cause such bait to ascend or descend when drawn through the water.

9. A substantially plane horizontally disposed plate adapted to be separably attached to the line-eye of a bait and free to move laterally relatively to the latter, and arranged to cause such bait to ascend or descend when drawn through the water.

In testimony that I claim the invention above set forth I affix my signature.

HENRY S. WELLES.